US005633676A

United States Patent [19]

Harley et al.

[11] Patent Number: 5,633,676

[45] Date of Patent: May 27, 1997

[54] APPARATUS AND METHOD FOR MOUNTING PRINTING PLATES AND PROOFING

[75] Inventors: Richard E. Harley, New York; Erik Mikkelsen, Selden, both of N.Y.

[73] Assignee: E. L. Harley Inc., Brooklyn, N.Y.

[21] Appl. No.: 518,053

[22] Filed: Aug. 22, 1995

[51] Int. Cl.[6] .................. H04N 7/18; F23J 3/00; B41F 5/00; B41B 11/00

[52] U.S. Cl. .................. 348/95; 101/DIG. 36; 33/614

[58] Field of Search .................. 348/94, 95, 86, 348/87, 88; 101/216, DIG. 36, 415.1, 486, 485; 33/614, 617, 615, 619, 620, 621, 618; 83/411.7

[56] References Cited

U.S. PATENT DOCUMENTS

| | | | |
|---|---|---|---|
| 2,289,557 | 7/1942 | Taylor . | |
| 2,452,373 | 10/1948 | Harley . | |
| 2,492,798 | 12/1949 | Harley . | |
| 2,493,628 | 1/1950 | Harley . | |
| 2,561,115 | 7/1951 | Harley . | |
| 4,520,389 | 5/1985 | Hornschuh . | |
| 4,653,369 | 3/1987 | Dunsirn | 83/411.7 |
| 5,031,334 | 7/1991 | Takamura . | |
| 5,132,911 | 7/1992 | Leader, Jr. et al. | 348/95 |
| 5,355,797 | 10/1994 | Tielrooy . | |
| 5,377,590 | 1/1995 | Bolza-Schunemann et al. | 33/621 |

FOREIGN PATENT DOCUMENTS 5-77402 3/1993 Japan .

OTHER PUBLICATIONS

Advertisement for Harley New Opti–Chek Mounting & Proofing Machine Series 4000.

Advertisement for Harley New Opti–Chek Narrow Web Mounting & Proofing Machine.

Advertisement for Harley Opti–Chek Model PC–4000 Corrugated Box Printing Plate Mounting and Proofing Machine.

Advertisement for Harley Opti–Chek Tape and Label Mounting Machine.

Flexographic Technology for Printers & Converters FLEXO, vol. 20/No. 3, Mar. 1995, p. 187.

Paper, Film & Foil Converter, Jan. 1994, p. 44.

EFM–Euro Flexo Magazine, vol. 11, 1, Jan./Feb. 1995, pp. 3, 7–8.

*Primary Examiner*—Amelia Au

*Attorney, Agent, or Firm*—Jordan and Hamburg

[57] ABSTRACT

A mounting and proofing apparatus has plate and layout cylinders rotatably mounted in a frame in parallel alignment to each other. A partial mirror is disposed proximate the plate and layout cylinder to permit a user looking into the partial mirror to view superimposed images of the layout and plate cylinders. At least one video camera is disposed above and directed at the partial mirror to image the superimposed images upon a video display having radicle markings. A layout sheet is installable on the layout cylinder indicating proper positioning of printing plates on the plate cylinder. The video camera optionally magnifies superimposed images of registration marks on the layout sheet and the plate cylinder. The user aligns the radicle with the registration mark, places a printing plate on the imaged area of the plate cylinder, and then aligns corresponding registration mark on the printing plate with that of the layout sheet. The magnification is sufficient to allow alignment of microdot registration marks on flexographic printing plates. Encoders allow a digital readout of camera positions and circumferential displacement of the plate and layout cylinders facilitating alignment verification and location of registration marks on the layout sheet. Optionally, the magnification of the video displays of the cameras may be altered optically or electronically to increase a field of view to allow alignment of printing patterns, and in particular those of slug plates, without the use of registration marks.

10 Claims, 7 Drawing Sheets

APPARATUS AND METHOD FOR MOUNTING PRINTING PLATES AND PROOFING

BACKGROUND OF THE INVENTION

The present invention relates to an apparatus and method for mounting printing plates and proofing and, more particularly, to a an apparatus having an optical alignment system incorporating video cameras. The apparatus is applicable in mounting plates having microdots for registration marks and other plate mounting situations.

In multicolor printing, printing cylinders or sleeves have printing plates mounted thereon corresponding to a desired color to be printed. Each printing plate for a given image color must be in correct relative alignment with the other color plates for the image which are mounted on other printing cylinders or sleeves for the plates to align on the same portion of web material during printing. Conventional mounting and proofing techniques for multicolor printing have employed registration targets on printing plates to allow proper alignment of printing plates on a either a printing cylinder or plate sleeve to be installed on a printing cylinder. Such targets generally consist of a circle of approximately quarter-inch diameter with cross-hairs therein. The targets are located on the printing plate at centers of each side and outside of the pattern desired to be printed. Thus, the final product has the desired printed image appearing without the targets being visible because the targets are printed on a portion of material which is either covered or removed. For example, in the converting industry which processes corrugated cardboard and other materials in to packaging products, such targets are typically located on flaps of boxes folded under opposing flaps or on bottoms and therefore are out of sight.

The use of registration targets is effective and provides for satisfactory alignment of plates. However, since the registration targets are readily visible, it is standard practice to put them outside of image sights. This requires that the plates be made larger than necessary for printing a given image. Additionally, since the printing cylinder or sleeve will generally have several plates mounted proximate to each other, the increased size of the plates can restrict flexibility in adjacent plate mounting.

Another system of registration includes pin registration. The plates are drilled at precise locations and the holes are then lined up with pins on the printing cylinder. This type of registration is traditionally used in offset printing where tight tolerances are maintained. However, flexographic printing has now adopted this method as the stability of flexible printing plates has improved due to advances in polymer technology. Tolerances of 1/32 of an inch are considered standard. While accurate, the registration technique is time consuming because extra operations are required to drill the printing plates using photonegatives as guides.

Conventional mounting techniques and machinery are exemplified by optical mounting and proofing devices disclosed in U.S. Pat. No. 2,289,557, A. K. Taylor; U.S. Pat. No. 2,452,373, E. L. Harley; U.S. Pat. No. 2,561,115, E. L. Harley; U.S. Pat. No. 2,492,798, E. L. Harley; and U.S. Pat. No. 2,493,628, E. L. Harley. Some of the disclosed devices are directed to flat bed printing while other are directed to cylinder printing. Regardless of the particular printing medium, the principle of operation remains generally consistent and therefore is discussed with reference to cylinder printing. Plates are positioned on a plate cylinder (also known as a form cylinder) while being optically compared with a layout sheet (sometimes called a registration sheet) on a layout cylinder (also called a mounting or proofing cylinder), or corresponding plates on a second plate cylinder. Optical systems of the devices use mirrors to superimpose images of the plates being mounted with corresponding images, or registration marks, on either the layout cylinder or a second plate cylinder. When the operator has the plates accurately aligned, the plates are held in place on the plate cylinder (which may in fact be a printing cylinder or a cylinder carrying a sleeve to be mounted on a printing cylinder) with stickyback material, a form of double-sided adhesive tape. Once the plates are secured in place, a proof may optionally be printed on the layout cylinder to ensure proper correspondence. Alternatively, because of the simplicity and accuracy of the visual alignment of the plates, time savings can be achieved by eliminating the proofing step. An example of one such machine is the Opti-Chek® Mounting and Proofing Machine Series 4000 produced by E. L. Harley Inc. of Brooklyn, N.Y.

Alignment of the plates using the above devices may be achieved by either aligning images themselves or target type registration marks. The layout cylinder has a layout sheet mounted thereon whereupon outlines and/or targets have been drawn to permit alignment of the plates. The plates are aligned with the layout so that proper alignment with the web and the other plates is achieved. Sometimes plates will have openings for the incorporation of smaller plates called "slugs." The use of slugs permits the individualizing of print runs. A standard product may be package by several distributors, each of which uses packaging material with the same basic layout but requires that the individual packages be identified somewhere on the packaging. Thus, slugs are added to a standard plate mounting to include such specialized information without the expense of requiring separate printing cylinders or sleeves for each packages. Such smaller plates will usually not include registration target and are aligned by eye with the rest of the standard plate. The optical mirror systems permit the operator to view the larger standard plate against the layout and the slug against any corresponding position marks on the layout sheet.

Another type of registration system called "microdot" is used in offset printing and is now being adopted in flexographic printing. The printing plates are provided with small dots, having a diameter in the range of 0.005 to 0.050 inches, and preferably in the range of 0.005 to 0.010 inches, which replace the conventional registration targets. Instead of being located outside the image sight as is done with registration targets, the microdots are located within the image sight since they are not readily apparent to the untrained eye. The microdots are formed photographically when the flexographic plates are developed are thus have a fixed relationship to the plate image. Since the microdots are incorporated in the image, the size of the plate may be reduced and greater flexibility in the alignment of adjacent plates is achieved. Due to the small size of the microdots, alignment using conventional optical mounting systems discussed above is virtually impossible because the user cannot visually discern the microdots to effect alignment of the microdots with their corresponding marks on the layout sheet of the layout cylinder or corresponding microdots on plates of the second plate cylinder. Furthermore, precise alignment is limited by parallax error introduced by the positioning of the viewers eye relative to the optical mechanism and the layout and plate cylinders.

Mounting systems using video technology are disclosed in U.S. Pat. No. 4,520,389, M. Hornschuh; U.S. Pat. No. 5,132,911, Leader, Jr. et al.; and U.S. Pat. No. 5,031,334, Takamura. In U.S. Pat. No. 4,520,389 a mounting and proofing machine is provided with a layout cylinder and a plate cylinder geared to rotate in unison. First and second video plate cameras are mounted to view the plate cylinder while first and second video layout cameras are mounted to view corresponding locations on the layout sheet mounted on the layout cylinder. Video signals from the cameras are electronically mixed to superimpose images of the layout cylinder over positionally corresponding images of the plate cylinder. By viewing the localized areas of two registration targets on the layout cylinder, the operator positions the printing plate on the plate cylinder with corresponding registration targets on the printing plate superimposed over the registration targets of the layout cylinder. The mounting and proofing machine requires that, in addition to the plate and layout cylinder being properly synchronized, each pair of cameras, first plate and layout cylinder cameras and second plate and layout cylinder cameras must be synchronized in position and movement. Furthermore, the multiple camera construction of the machine requires video mixing electronics for superimposing the video images and maintenance of the proper calibration of the mixing alignment.

The mounting apparatus of U.S. Pat. No. 5,132,911 has a single video camera orthogonally displaceable above an orthogonally displaceable turntable upon which an operator places a printing plate. A plate cylinder, adjacent the turntable, is automatically positioned at a home position in known alignment with the turntable and video camera. A computer then scans the printing plate with the video camera to locate the first and second registration marks and stores their position. Based on the known positions of the registration marks, the turntable is repositioned to place the registration marks in proper alignment with the plate cylinder. Once in proper alignment, the printing plate is moved off the turntable by a pressure roller and onto the plate cylinder while the plate cylinder rotates as required to accept the printing plate at the correct position. By implication, the proper location of the registration marks on the printing plate on the plate cylinder must be calculated and preprogrammed for the apparatus to determine where to position the printing plate on the plate cylinder, especially where multiple plates are to be mounted in relative alignment. Thus, a skilled technician must be able to properly calculate positioning of printing plates or the reference marks on the plate cylinder and program the machine accordingly. Furthermore, since there is no optical comparison with a layout cylinder, the operator has no visual indication of the proper positioning of printing plates or slugs on the plate cylinder with respect to a layout sheet. Likewise, aside from actual proofing, the is no visual indication of proper plate alignment from plate cylinder to plate cylinder to ensure coherence of color alignment.

In U.S. Pat. No. 4,520,389 the mounting device has a video camera mounted below a flat plate holder upon which a printing plate is to be mounted. The camera is rotated to align cross-hairs of the camera with a grid on the flat plate holder. Interposed between the video camera and the flat plate holder is a transparent printing plate carrier which is alignable in X, Y, and Θ directions. The printing plate has a corresponding grid countersunk on its face and is place face down in the plate carrier. The plate carrier is then positioned to place the grid of the printing plate into alignment with the camera cross-hairs which have previously been aligned with the grid of the plate holder. The plate holder is then lowered on the printing plate which is attached using double-sided tape. Once again, there is no opportunity for the operator to visually proof the plate image onto a layout sheet in order to ensure alignment. Furthermore, there is no apparent means for multiple plates to be mounted and it is required that the flat plate holder have a standard grid. Finally, the mounting machine does not incorporate a means for producing an actual proof print to test alignment.

In order to provide flexibility in mounted printing plates, and in particular flexographic printing plates, a mounting apparatus is needed which provides for using microdot registration while allowing for direct visual verification of alignment with a layout sheet and the placement of multiple printing plates, including slugs, onto a plate cylinder. Simultaneously, it is desirable that such an apparatus minimize mechanical and electronic complexity in order to provide reliable yet economical operation requiring a minimum of calibration and maintenance while enhancing accuracy of mounting over that of the prior art.

SUMMARY OF THE INVENTION

Accordingly, it is an object of the invention to provide a mounting and proofing apparatus which overcomes the drawbacks of the prior art.

It is a further object of the invention to provide a mounting and proofing apparatus capable of mounting flexographic plates having microdot registration markings.

It is a still further object of the invention to provide a mounting and proofing apparatus permitting direct optical verification of plate mounting, proofing, and magnification required to effect registration using microdots.

It is yet another object of the invention to provide a mounting and proofing machine allowing both magnified registration mark alignment and wide fields of view permitting alignment of slug plates in conjunction with other mounted plates.

An object of the present invention is to provide a method and means for effecting microdot registration alignment with a layout sheet incorporating optical superposition of registration marks and layout marks allowing direct visual verification of alignment against the layout sheet.

Briefly stated, the present invention provides a mounting and proofing apparatus having plate and layout cylinders rotatably mounted in a frame in parallel alignment to each other. A partial mirror is disposed proximate the plate and layout cylinder to permit a use looking into the partial mirror to view superimposed images of the layout and plate cylinders. At least one video camera is disposed above and directed at the partial mirror to image the superimposed images upon a video display having radicle markings. A layout sheet is installable on the layout cylinder indicating proper positioning of printing plates on the plate cylinder. The video camera optionally magnifies superimposed images of registration marks on the layout sheet and the plate cylinder. The user aligns the radicle with the registration mark, places a printing plate on the images area of the plate cylinder, and then aligns corresponding registration mark on the printing plate with that of the layout sheet. The magnification is sufficient to allow alignment of microdot registration marks on flexographic printing plates. Encoders allow a digital readout of camera positions and circumferential displacement of the plate and layout cylinders facilitating alignment verification and location of registration marks on the layout sheet. Optionally, the magnification of the video displays of the cameras may be altered optically or electronically to increase a field of view to allow alignment of printing patterns, and in particular those of slug plates, without the use of registration marks.

In accordance with these and other objects of the invention, there is provided a mounting apparatus, for mounting a printing plate on a plate cylinder in correspondence with a layout sheet, comprising: a layout cylinder for accepting mounting of the layout sheet thereto; a frame rotatably supporting the layout cylinder; the frame including plate cylinder support means for rotatably supporting the plate cylinder with an axis thereof parallel to an axis of the layout cylinder; a drive mechanism for synchronously rotating the plate and layout cylinders in opposite directions at equal circumferential displacement rates; at least one partial mirror supported on the frame at a position proximate and parallel to the plate and layout cylinders to combine light traveling along first and second optical paths from corresponding locations on the plate and layout cylinders to form a superimposed image of the plate and layout cylinders viewable along a common optical path; at least one video camera and video display; the frame having camera support means for supporting the video camera at a position disposed along the common optical path to image the superimposed image; the camera support means including sliding support means for permitting travel of the camera parallel to the axes of the plate and layout cylinders; and positioning means for disposing the plate and layout cylinder relative to the partial mirror to effect substantially equal object distances from the plate and layout cylinders and substantial perpendicular alignment of virtual extensions of the first and second optical paths with axes of the plate and layout cylinders.

The present invention also provides a mounting apparatus, for mounting a printing plate on a plate cylinder in correspondence with a layout sheet, comprising: a layout cylinder for accepting mounting of the layout sheet thereto; a frame rotatably supporting the layout cylinder; the frame including plate cylinder support means for rotatably supporting the plate cylinder with an axis thereof parallel to an axis of the layout cylinder; a drive mechanism for synchronously rotating the plate and layout cylinders in opposite directions at equal circumferential displacement rates; first and second video cameras having first and second video displays respectively; at least one partial mirror supported on the frame at a position proximate and parallel to the plate and layout cylinder to combine light traveling along first and second optical paths from corresponding locations on the plate and layout cylinders to form superimposed images of the plate and layout cylinders viewable along common optical paths defined by focal points of the first and second video cameras respectively; the frame having a horizontal rail member parallel to and extending a length of the axis of the layout cylinder for supporting the first and second video cameras at positions disposed along the common optical paths to image the superimposed image; first and second slidable assemblies associated with the first and second video cameras, each mounted on the horizontal rail member and including means for permitting travel along the horizontal rail member; first and second camera support arms respectively connecting the first and second video cameras to the first and second slidable assemblies; the first and second camera support arms including means for adjustably positioning the first and second video cameras to set points of focus defining the common optical path for each of the first and second video cameras thereby effecting substantial alignment of virtual extensions of the first and second optical paths with axes of the plate and layout cylinders; and positioning means for disposing the plate and layout cylinders relative to the partial mirror to effect substantially equal object distances from the plate and layout cylinders and substantially perpendicular alignment of virtual extensions of the first and second optical paths with axes of the plate and layout cylinders respectively.

The present invention also includes the above embodiments wherein, in the alternative, various implementations of features of the above embodiments are incorporated. For example, the camera can incorporate optical means for enlarging the superimposed image an amount sufficient to permit viewing of microdot registration marks. Furthermore, the apparatus optionally includes a video processing means for superimposing at the video display a reticle pattern on the superimposed image. Alternatively, an embodiment of the present invention may further comprise a video processing means for enlarging the superimposed image an amount sufficient to permit viewing of microdot registration marks, and means for superimposing at the video display a reticle pattern on the superimposed image.

The present invention also includes the above embodiments wherein, in the alternative, the horizontal rail member includes: a support member mounted in the frame; at least one rail member determining positions of the first and second video cameras relative the layout and plate cylinder; and support means for variably supporting and positioning the at least one rail member relative to the support member. The support means includes and embodiment wherein a first set of screws is disposed over a length of the at least one rail member threaded to the support bar for drawing the at least one rail member towards the support bar; and a second set of screws is individually interposed amongst the first set of screw, the second set of screws being threaded into the at least one rail member and having ends abutting the support member to position the at least one rail member away from the support bar.

The above, and other objects, features and advantages of the present invention will become apparent from the following description read in conjunction with the accompanying drawings, in which like reference numerals designate the same elements.

DETAILED DESCRIPTION OF THE INVENTION

Figure 1:
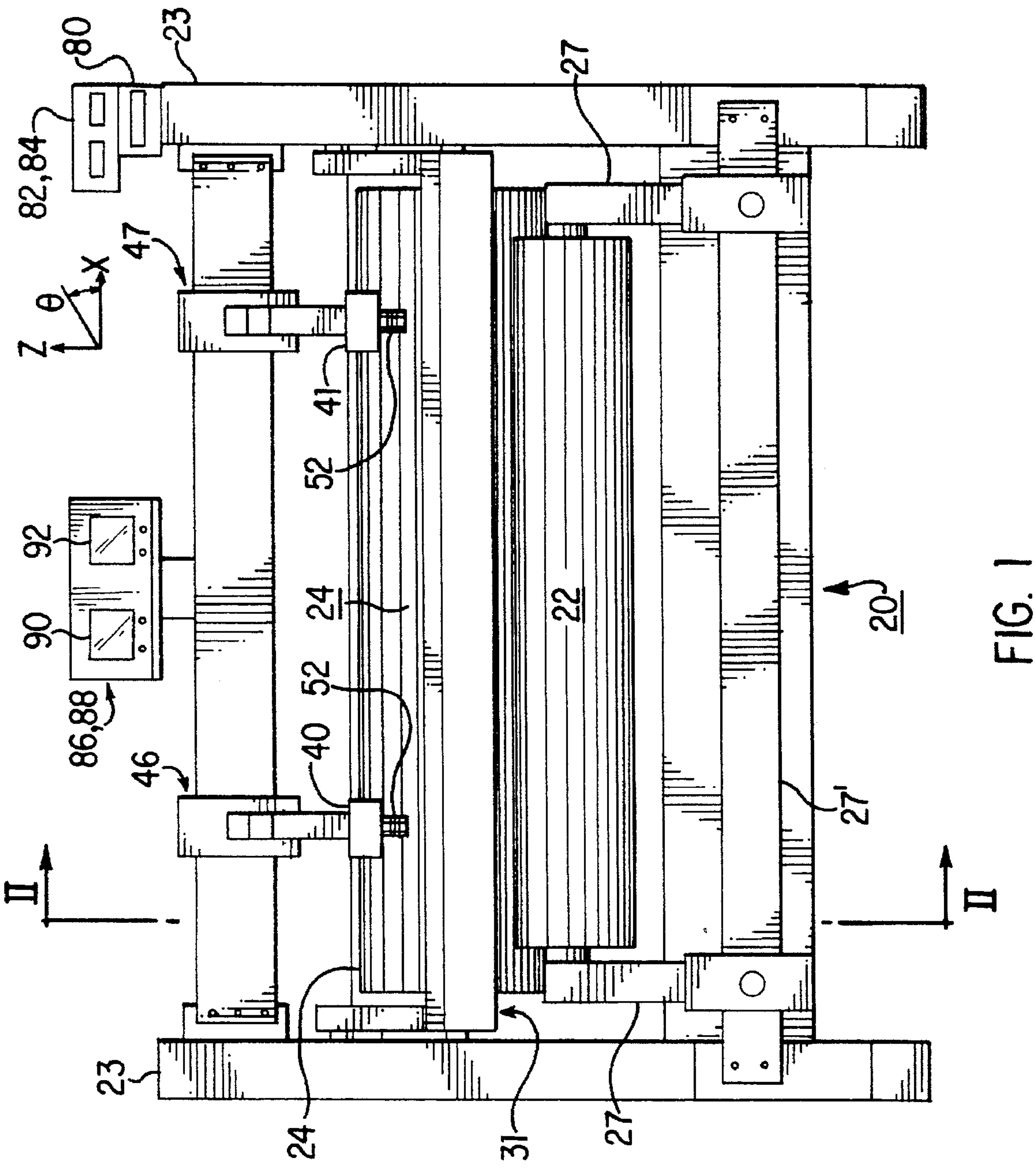
FIG. 1 is a front view of an embodiment of the present invention.
Figure 2:
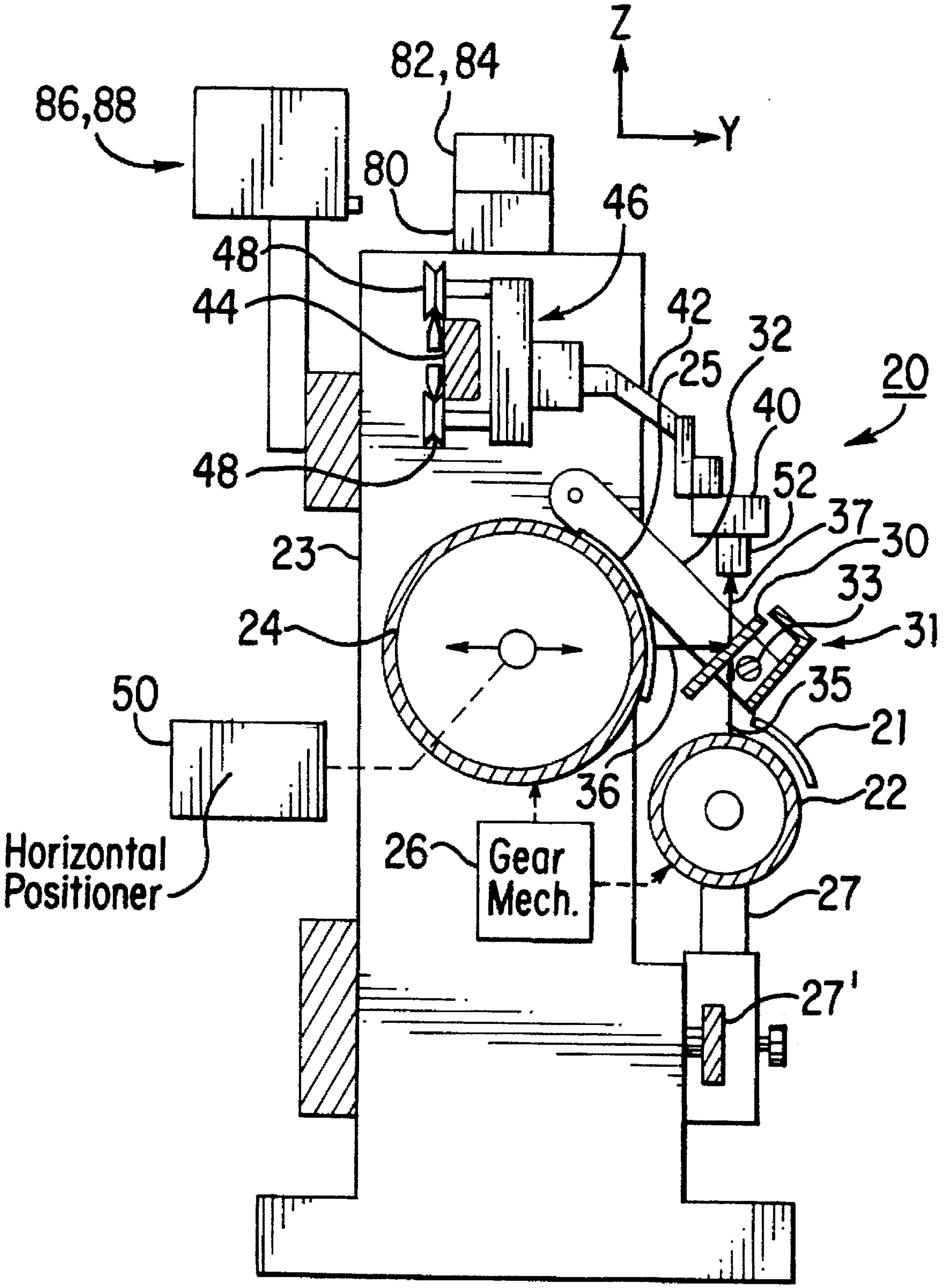
FIG. 2 is a side cross-sectional view of the embodiment of FIG. 1 taken along line II—II.

Referring to FIGS. 1 and 2, a mounting apparatus 20 has a frame 23 rotatably supporting a plate cylinder 22 upon telescoping supports 27. The telescoping supports 27 which provide height adjustment and are slidably mounted a horizontal bar 27'. The height adjustment accommodates plate cylinders of differing diameters while the slidable horizontal mounting allows plate cylinders of differing lengths to be mounted. The frame 23 also rotatably supports a layout cylinder 24 which is shown with a layout sheet 25 mounted upon it in FIG. 1. The layout sheet 25 is a diagram of the alignment of printing plates to be mounted on the plate cylinder. The layout sheet 25 has a layout pattern drawn on it indicating the correct positioning of at least a single printing plate 21 on the plate cylinder 22. In common practice however, several printing plates are mounted on the plate cylinder 22 and must be correctly positioned relative to each other and the plate cylinder 22. The layout sheet 25 has registration marks such as cross-hair targets or microdots corresponding to the same on the printing plate 21 or, alternatively or in combination, the layout sheet in some instances has a plate outline or pattern drawn to indicate proper plate registration. To effect the positioning of the printing plate 21, an image of the layout sheet 25 is optically superimposed over an image of the plate cylinder 22 as discussed in detail below.

The layout cylinder 24 and the plate cylinder 22 are interconnected by a gear mechanism 26 (shown schematically) used to rotate both the plate and layout cylinders, 22 and 24, synchronously in opposite directions to match their circumferential displacements. The gear mechanism 26 is preferably of the anti-backlash type and is operable manually or by a motor drive. Various gearing arrangements may be implemented by those of ordinary skill in the art to effect the interconnection of the layout and plate cylinders, 24 and 22, hence further details of the gear mechanism 26 are omitted.

A partial mirror 30 is mounted upon a mirror assembly 31 having a pivoting arm 32. The partial mirror 30 extends over the longitudinal lengths of both the plate and layout cylinders, 22 and 24 as does a fluorescent lamp 33 for illuminating the cylinders, 22 and 24. The mirror assembly 31 is rotatable on the pivoting arms 32 between an operating position as shown and a raised position allowing a clear view of the plate cylinder 22 and proofing. The partial mirror 30 is only partially reflective, reflecting in the range of 40 to 60% of incident light, therefore allowing a substantially reciprocal amount of light to pass through. The partial reflectance operates to combine light reflected from both the plate and layout cylinder, 22 and 24. Light from the plate cylinder 22 travels along a first path 35 to the partial mirror 30 and light from the layout cylinder 24 travels along a second path 36 to the partial mirror 30. The partial mirror 30 reflects a portion of light from the layout cylinder 24 and transmits a portion of light from the plate cylinder 22 (ignoring the offset due to the refractive index of the partial mirror 30) to superimpose the light rays along a third path 37, thus superimposing images of both the layout sheet 25 and the printing plate 21 (when mounted) to permit registration. The operator then manipulates the position of the plate 21 to align registration marks on the plate 21 with corresponding marks on the layout sheet 25.

First and second video cameras, 40 and 41, are supported on arms, 42 and 43, which in turn are slidably mounted onto a support bar 44 by means of roller bearing assemblies, 46 and 47. The roller bearing assemblies, 46 and 47, have V-groove rollers 48 which ride on V-rails of the support bar 44. The support bar 44 extends the longitudinal length of both the plate and layout cylinders, 22 and 24, thus allowing the video cameras, 40 and 41, to travel parallel to longitudinal axes of the plate and layout cylinders, 22 and 24, and image the entire surfaces of both cylinders. The cameras, 40 and 41, are in proper alignment with the layout and plate cylinders, 24 and 22, when the first and second light paths, 35 and 36, are substantially equal in length and virtual extensions thereof intersect the center axes of the plate and layout cylinder, 22 and 24, respectively. The layout cylinder 24 is rotatably supported in the frame 23 by a horizontal positioned mechanism 50 (shown schematically) for moving the layout cylinder 24 into a proofing position whereat contact is made with the plate cylinder 22 and a mounting position where the first and second light paths, 35 and 36, are substantially equal in length.

In an embodiment of the present invention, the cameras, 40 to 41, are solid state video cameras using CCD video technology. The lenses 52 range in focal length from 35 to 45 mm, however, it is realized that varying optical configurations outside of this range may be employed and are considered to be within the scope of the present invention. Similarly, while the described embodiment utilizes a video imaging system, other imaging systems may be used to provide an image of the registration marks and layout sheet 25.

Differences in lengths of the light paths, 35 and 36, present the possibility of focusing difficulties and parallax error. A tolerable difference in length is in part dependent on the f-stop setting of lenses 52 which determines the depth of the field of focus. Higher f-stop setting increase the depth of focus and therefore provide for greater tolerance. A further consideration in determining length difference tolerance is parallax error. Parallax error is commonly associated with reading analog gauges where the viewer does not view the gauge needle perpendicular with respect to a plane of the gauge scale and therefore mentally superimposes the gauge needle over an incorrect portion of the gauge scale resulting in an incorrect reading being. The amount of error is partially dependent upon a distance between the needle and scale which results in different optical path lengths. If the cameras, 40 and 41, do not have light paths with extensions passing through and perpendicular to the axes of the plate and layout cylinders, 22 and 24, length differences will contribute to parallax error which will distort the apparent location of the superimposed registration mark. Where a high F-stop is used, both plate and layout marks will appear in focus while having differing object distances. Thus, the camera mounting of the present invention is used to ensure a proper viewing angle of the plate and layout cylinders, 22 and 24.

Conventional mounting techniques require an operator to view the superimposed images by looking down into the partial mirror 30 which, dependent upon the position of the operators head, may result in mounting errors. Where there are differences in optical path lengths, object distances, deviations in the user's viewing angle from that of perpendicular to the cylinder axes will result in parallax errors. Assuming the light paths, 35 and 36, are equal in length, if the operators line of sight is offset from the illustrated paths there will be an error produced by the differing diameters of the plate and layout cylinders 22 and 24.

The present invention has the video cameras, 41 and 42, securely mounted in position above the partial mirror 30 ensuring that the light paths, 35 and 36, have extensions perpendicular to and intersecting the center axes of the cylinders, 22 and 24. The cameras, 41 and 42, are aligned using registration lines incorporated into the plate and layout cylinders, 22 and 24, by setting positioning mechanisms (not shown) incorporated into the arms 42 which allow adjustment of the camera position sufficient to effect correct alignment. In particular, adjustments are provided to effect positioning of the cameras, 40 and 41, in the Y and Z axes directions on in the angular Θ direction. Details of the various positioning mechanisms are omitted as such are known and may be effected by those of ordinary skill in the art. Once the cameras, 40 and 41, are aligned over the plate cylinder 22, the layout cylinder 24 is aligned to be viewed in proper correspondence with the superimposed image of the plate cylinder registration line. The cameras, 40 and 41, are then locked in place using the positioning mechanisms of the arms 42 thereby allowing the cameras, 40 and 41, to be moved solely along the support bar 44 on the X axis (shown in FIG. 1), parallel to the longitudinal axes of the cylinders, 22 and 24.

The support bar 44 is preferably precision machined to provide top and bottom V-guides which are sufficiently straight along the X-axis to maintain camera position tolerance as the cameras, 40 and 41, are slid along the guide bar. Should the V-guides deviate from a true straight line, the cameras' 40 and 41 point of focus will deviate from the top of the plate cylinder 22 and errors will result. Therefore, it is important that the support bar 44 provide a straight track parallel to the axes of the plate and layout cylinders, 22 and 24.

Figure 3:
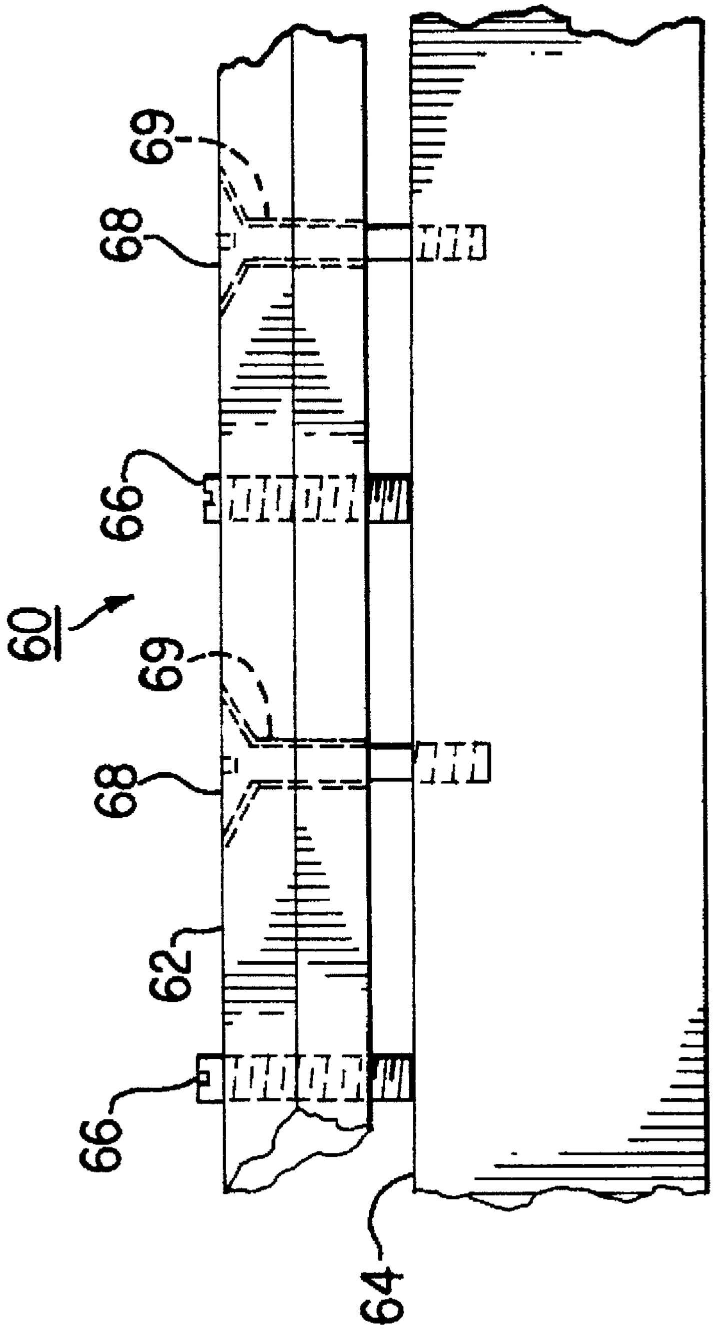
FIG. 3 is a top partial view of an embodiment of a support bar of the apparatus of FIG. 1.

Referring to FIG. 3, a partial top view shows an embodiment of the support bar 44 having a V-rail 62 is positioned from a structural support bar 64 by first and second sets of screws, 66 and 68. The first and second sets of screws, 66 and 68, are positioned over the length of the support bar 44 and serve to adjust the positioning of the V-rail 62 in the direction of the Y-axis of FIG. 2. The first set of screws 66 are set screws are threaded in the V-rail 62 and position the V-rail 62 away from the structural support bar 64. The second set of screws 68 pass through clearance holes 69 in the V-rail 62 and are threaded into the structural support bar 64 to draw the V-rail 62 towards the structural support bar 64. By sequentially adjusting the first and second sets of screws, 66 and 68, to keep the camera's focus centered on the registration line of the plate cylinder 22 as the camera 40 is move along the support rail 60, the support rail 60 is adjusted to within the necessary tolerance in the Y-direction. Thus, depending upon the size of the support bar to be used and the expenses of precision machining, either a solid or adjustable support bar may be used.

Figure 4:
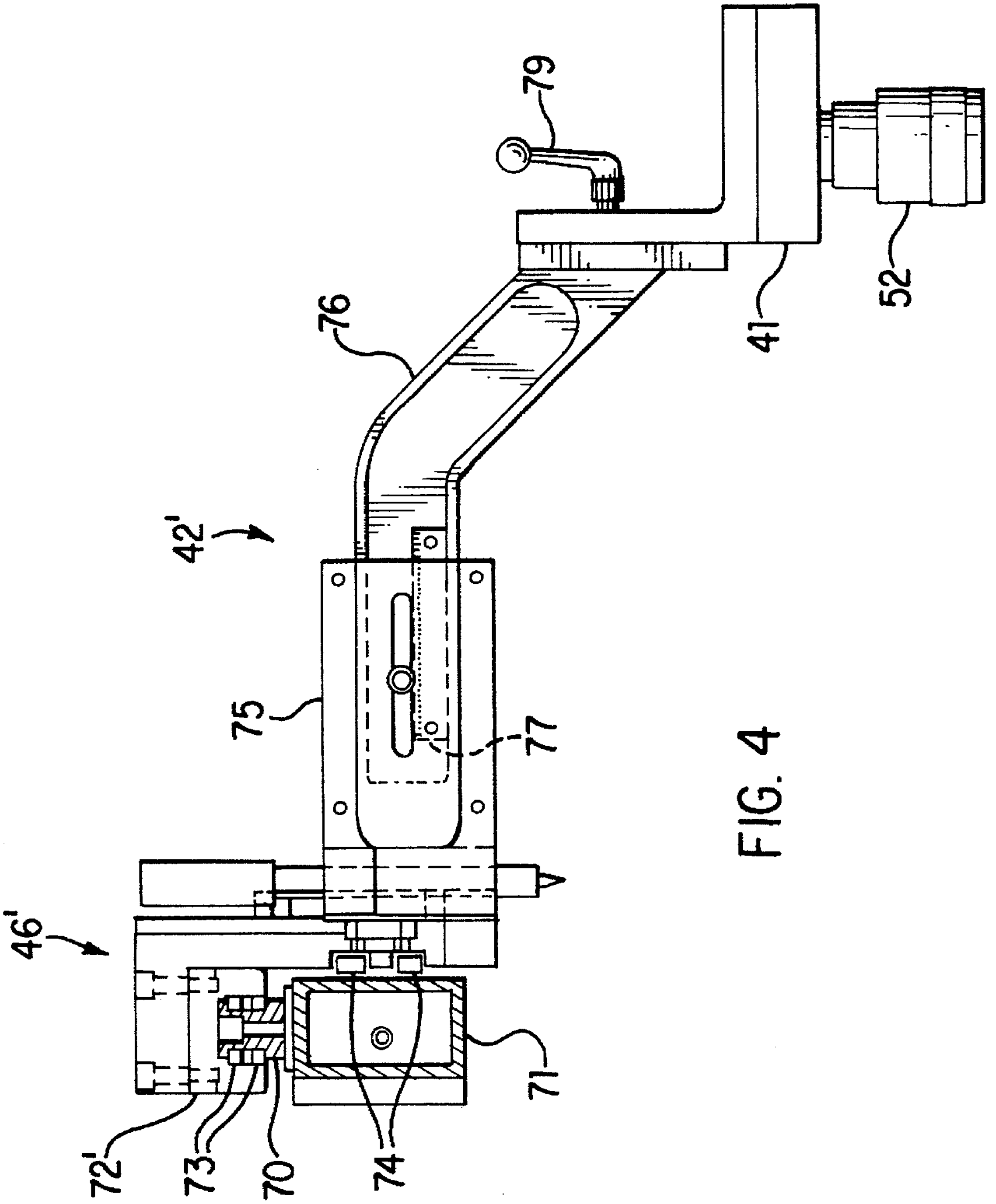
FIG. 4 is a side view of another embodiment of a camera support arm for incorporation into the embodiment present invention in FIG. 1.
Figure 5:
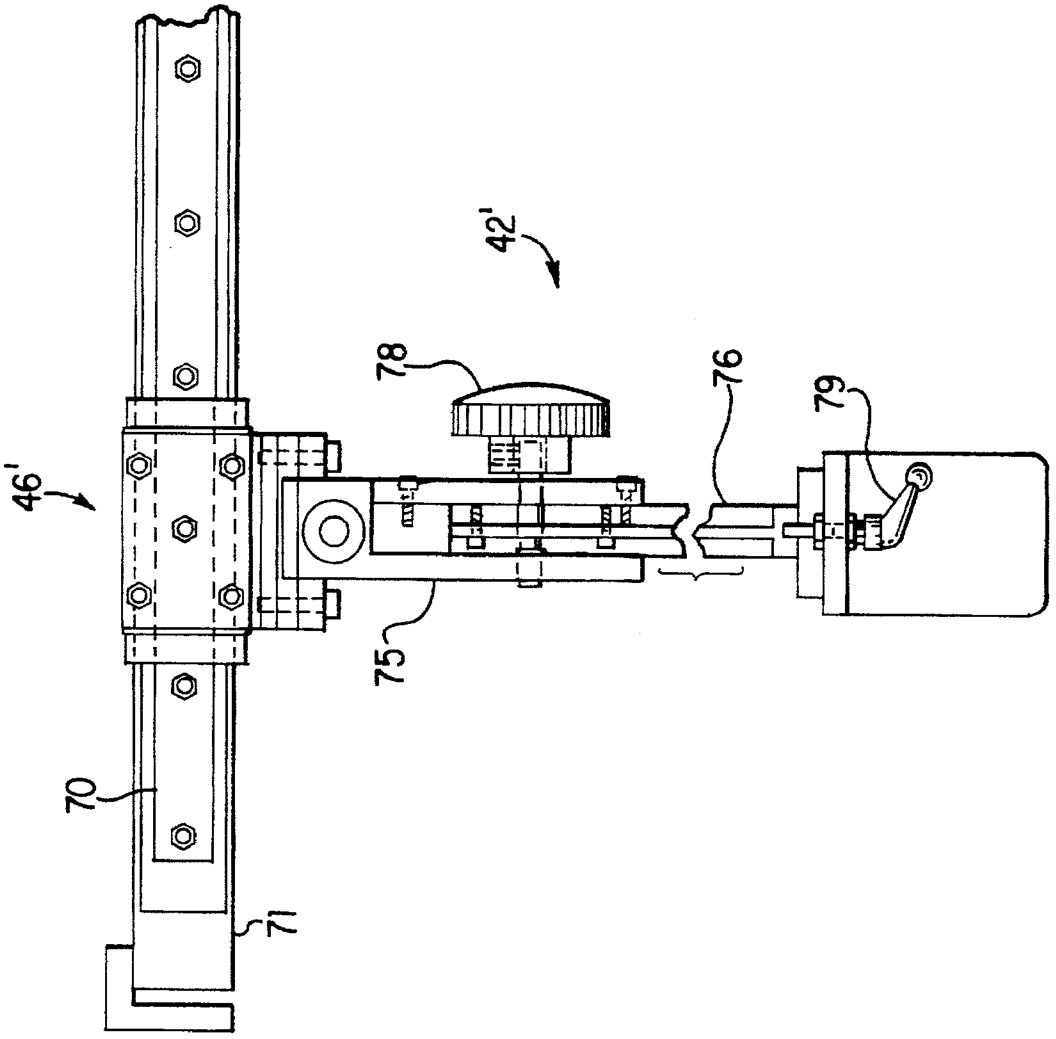
FIG. 5 is a plan view of the camera support arm of FIG. 4.

Referring to FIGS. 4 and 5, an alternative camera mounting arrangement is shown wherein a slide assembly 46' travels on an I-beam rail 70 supported upon a box beam 71. The slide assembly has a linear bearing unit 72 with recirculating ball bearings 73 which engage the I-beam rail 70 at four internal corners thereof and roller bearings 74 engaging a side of the box beam 71. A first arm member 75 slidably engages a second arm member 76 to allow horizontal adjustment of camera position using a rack and pinion assembly 77 manually operated via a knob 78. The rack and pinion assembly 77 allows precise alignment of the camera 41, in the Y-direction (shown in FIG. 2), to position the focal path in intersection with the axis of the plate cylinder 22. A clamp 79 secures the camera 41 to the second arm member 76 and allows the vertical position and angular alignment (designated by Θ in FIG. 2) of the camera 41 to be adjusted to assure that the focal path is perpendicular to the axis of the plate cylinder 22. The downward bend of the second arm member 76 positions the camera close to the mirror assembly 31 reducing the amount of magnification required.

Figure 6:
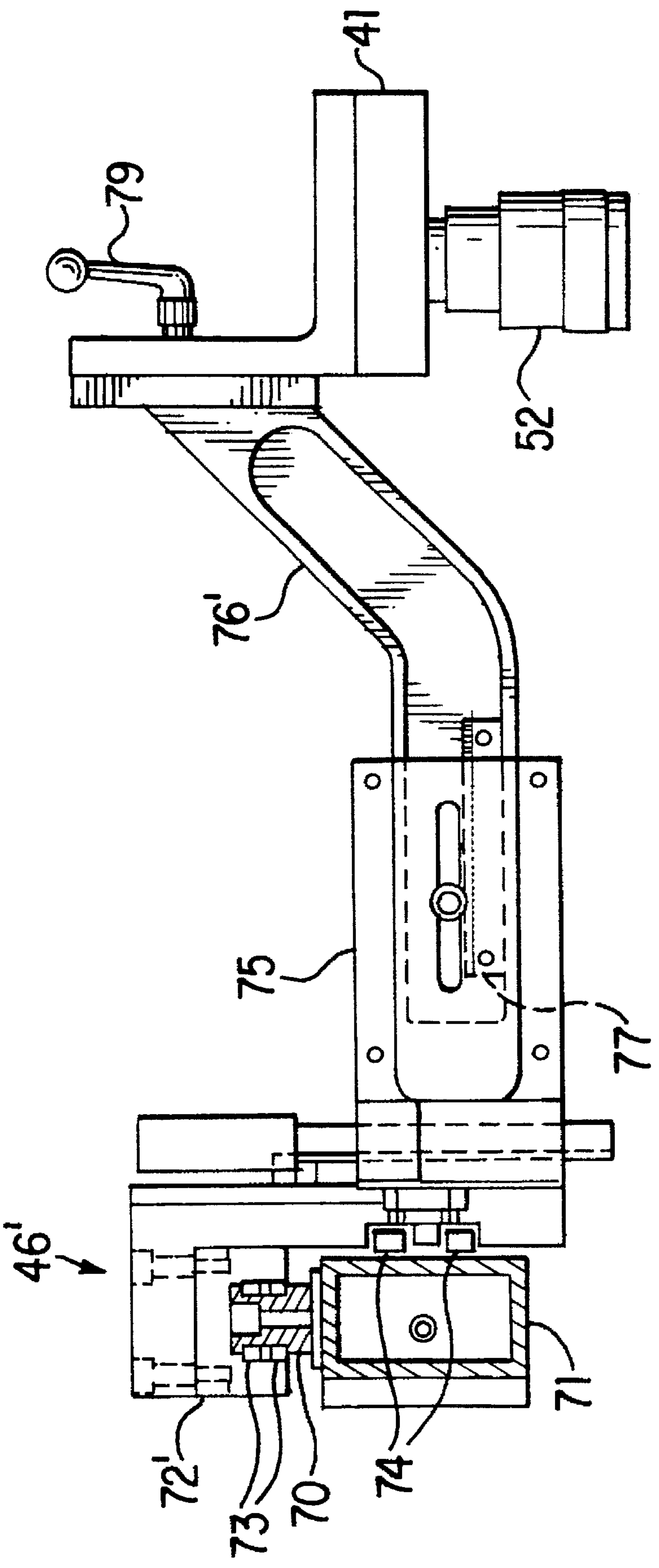
FIG. 6 is a side view of another embodiment of a camera support arm for incorporation into the embodiment of the present invention in FIG. 1.

Referring to FIG. 6, further camera mounting arrangement is shown which is identical to that of FIGS. 4 and 5 with the exception of a second arm member 76' having an upwards bend in place of the downward bend of the second arm member of FIGS. 4 and 5. The upward bend raises the camera 41 further apart from the mirror assembly 31 and plate cylinder 22. The added clearance between the plate cylinder 22 and the camera 41 provides the user with added working room to work on the plate cylinder 22. The added clearance is advantageous when the mirror assembly 31 is swung on the pivoting arms 32 into a position (not shown) above the layout cylinder 24 such as is done when installing and removing the plate cylinder 22. The focal length of the lens 52 is adjusted accordingly along with the magnification power.

Figure 7:
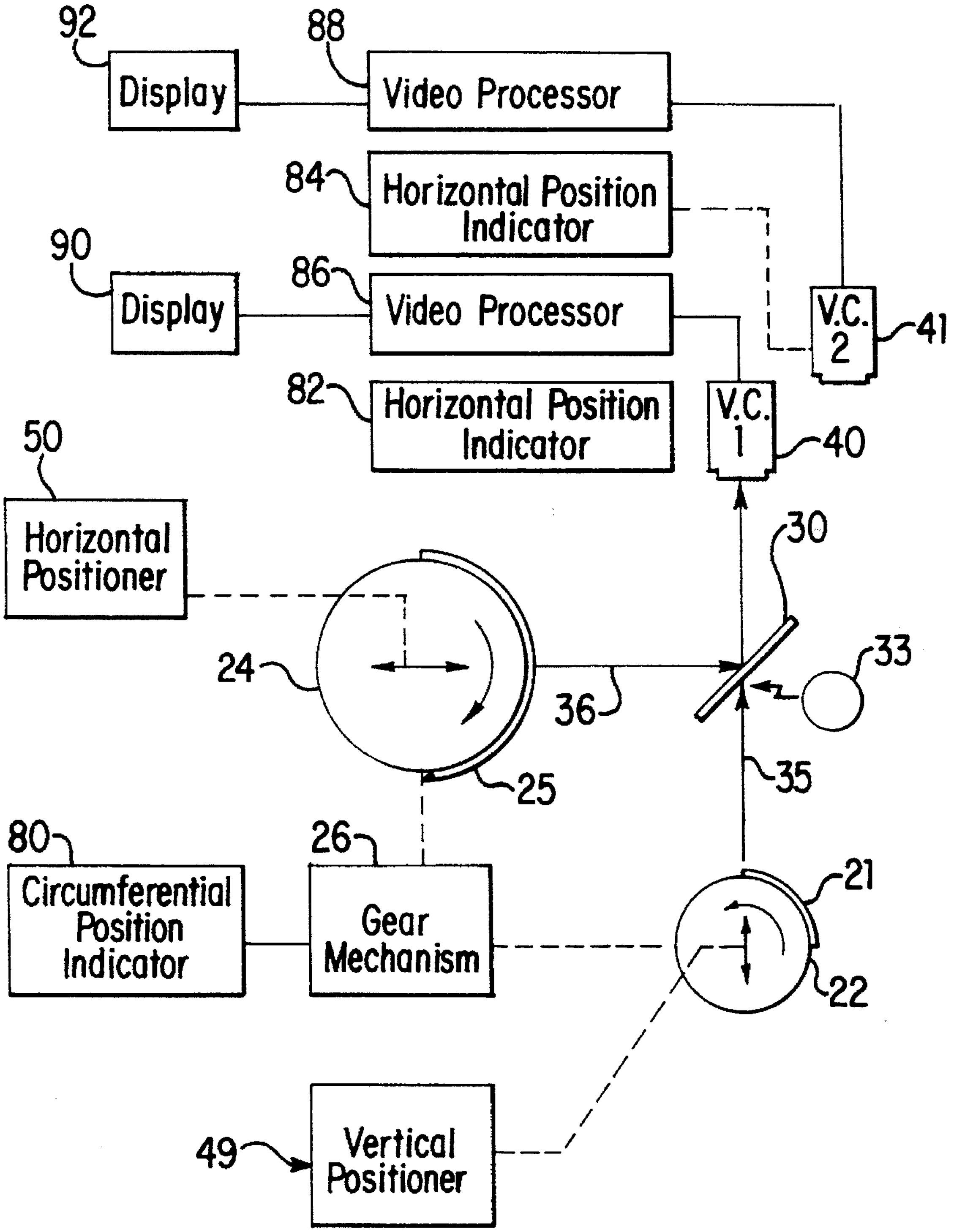
FIG. 7 is a schematic block diagram of the embodiment of FIG. 1.

Referring to FIG. 7, a block diagram schematic of an embodiment the present invention of FIGS. 1 and 2 shows the gear mechanism 26 interconnecting the plate and layout cylinders 22 and 24. The gear mechanism 26 optionally incorporates a motor drive which may be either of the stepper of servo variety. Details of such a configuration are omitted as being realizable by those of ordinary skill in the art of automation having the benefit of this specification. Such configurations are thus considered to be within the scope and spirit of the present invention. As stated above, the gear mechanism 26 rotates the plate and layout cylinders 22 and 24 in opposing directions at equal circumferential displacement rates. A circumferential position indicator 80 interconnects with the gear mechanism 26 using a digital encoder to determine the circumferential displacement of the layout and plate cylinders 22 and 24 and provide a digital readout of circumferential position viewed by the cameras 40 and 41.

The positions of the plate and layout cylinders, 22 and 24, are adjustable in horizontal and vertical directions. The rotatable supports for the plate cylinder 22 are positionable vertically by the vertical positioned 49 to accept plate cylinders of varying diameters. The vertical positioned 49 takes the form of the telescoping supports 27 of FIGS. 1 and 2 which are lockable at varying heights by conventionally employed locking means. The layout cylinder 22 is moved horizontally by the horizontal positioned 50 allowing for adjustment of the optical path length 36 and proofing. As in the case of the gear mechanism 26, the positioning mechanisms are operated manually or may be driven by motors and automated. Such variations are similarly realizable by those of ordinary skill in the art in light of this specification.

The cameras, 40 and 41, have first and second horizontal position indicators, 82 and 84, which include encoder wheels (not shown) for detecting displacement along the support bar 44 in the direction of the X-axis. The horizontal position indicators, 82 and 84, are zeroed at a fixed reference point on the plate cylinder 22 from which displacement is measured. The reference points are traditionally marked by intersections of scribed axial and circumferential lines (not shown) on the plate cylinder. Each of the cameras, 40 and 41, feeds a signal to a respective one of first and second video processors, 86 and 88, which in turn send video signals to respective ones of first and second video displays, 90 and 92.

The video processors, 86 and 88, superimpose reticle lines on the displays, 90 ad 92, which may be of a cross-hair or circular configuration. The cross-hair reticle is preferred when target type registration marks are used and the circular configuration is preferred when microdots are used as registration marks. Controls on the video processors, 86 and 88, allow the horizontal and vertical positioning of the reticles on the displays, 90 and 92, to be adjusted independently. This provides a means of finely adjusting the accuracy of positioning. The center of each reticle is alignable on a fixed reference point on one of the plate or layout cylinders, 22 and 24, to compensate for minor differences in the physical alignment of the cameras, 40 and 41. Furthermore, the video processors, 86 and 88, optionally effect video magnification of an image thereby allowing variable fields of view.

While magnification can be accomplished using video processing, the cameras, 40 and 41, are preferably provided with lenses 52 that are automatic or manual zoom lenses capable of varying magnification while remaining in focus. Thus, sufficient magnification is achieved to allow for the alignment of microdots having dimensions on the order of 0.005 inches. Such magnification is preferably in the range of 10X to 30X. However, where microdots are not used and slugs, for instance, are to be visually aligned with a surrounding print pattern, magnification may be decreased to provide a larger field of view encompassing the surrounding print pattern. The present invention thus provides for flexibility in registration system selections and combinations.

The displacement measurements may be used in locating registration targets, or microdots, or to verify dimensions of the drawing on the layout sheet 25. The user manually displaces the cameras, 40 and 41, along the support bar 44 until alignment with registration marks on the layout sheet 25 is achieved. Alternatively, the displacement of the cameras, 40 and 41, may optionally be motorized and automated. A verification of the location of the marks may be made by checking the readings of the horizontal position indicators, 82 and 84. Once the positions are verified, the user then installs the printing plate 21 on the plate cylinder 22 by aligning the corresponding registration marks on the printing plate 21 with those on the layout sheet 25.

Another mounting method uses the horizontal position indicators, 82 and 84, and the circumferential position indicator 80 to position printing plates fixed offset distances from established registration marks. The user first aligns the reticles of the displays, 90 and 92, with a given registration mark or marks, and then repositions the cameras, 40 and 41, along the support bar 44 to effect the desired amount of horizontal displacement. The plate and layout cylinders, 22 and 24, are then rotated by the gear mechanism 26 an amount equal to the desired circumferential offset. The printing plate is then mounted in alignment with the reticles of the displays, 90 and 92, onto the plate cylinder 22.

The video cameras, 40 and 41, allow the operator to visually align the microdots with a layout image, eliminating the need for calculation, and providing immediate optical verification of positioning. Other systems have relied upon video mixing or programmed coordinates to effect mounting operations wherein the operator has no purely optical verification of proper plate alignment against a layout pattern. The present invention allows the operator to bypass the use of the cameras, 40 and 41, to make direct visual verification of plate alignment by purely optical means effected by the partial mirror 30. Furthermore, such a mode of operation allows plates, such as slugs, without registration marks to be mounted with other plates having microdot registration marks. Finally, the operator can directly view the plate cylinder 22 by raising the mirror assembly 31, rotating upon the pivoting arms 32, to a position above the layout cylinder 24 permitting an unobstructed view of the plate cylinder 22. The raised position of the mirror assembly 31 permits the plate 21, or plates, mounted on the plate cylinder 22 to be inked for proofing.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A mounting apparatus, for mounting a printing plate on a plate cylinder in correspondence with a layout sheet, comprising:

a layout cylinder for accepting mounting of said layout sheet thereto;

a frame rotatably supporting said layout cylinder;

said frame including plate cylinder support means for rotatably supporting said plate cylinder with an axis thereof parallel to an axis of said layout cylinder;

a drive mechanism for synchronously rotating said plate and layout cylinders in opposite directions at equal circumferential displacement rates;

at least one partial mirror supported on said frame at a position proximate and parallel to said plate and layout cylinders to combine light traveling along first and second optical paths from corresponding locations on said plate and layout cylinders to form a superimposed image of said plate and layout cylinders viewable along a common optical path;

at least one video camera and video display;

said frame having camera support means for supporting said video camera at a position disposed along said common optical path to image said superimposed image;

said camera support means including sliding support means for permitting travel of said camera parallel to said axes of said plate and layout cylinders; and positioning means for disposing said plate and layout cylinders relative to said partial mirror to effect substantially equal object distances from said plate and layout cylinders and substantial perpendicular alignment of virtual extensions of said first and second optical paths with axes of said plate and layout cylinders.

2. The apparatus according to claim 1 further comprising said camera having optical means for enlarging said superimposed image an amount sufficient to permit viewing of microdot registration marks.

3. The apparatus according to claim 2 further comprising a video processing means for superimposing at said video display a reticle pattern on said superimposed image.

4. The apparatus according to claim 1 further comprising a video processing means for enlarging said superimposed image an amount sufficient to permit viewing of microdot registration marks.

5. The apparatus according to claim 4 further comprising said video processing means having means for superimposing at said video display a reticle pattern on said superimposed image.

6. The apparatus according to claim 1 further comprising said frame including means for positioning said layout cylinder relative said partial mirror to equalize object distance form said layout and plate cylinders to said camera.

7. The apparatus according to claim 1 further comprising said camera support means including means for adjustably positioning said camera to effect substantial alignment of virtual extensions of said first and second optical paths with axes of said plate and layout cylinders.

8. A mounting apparatus, for mounting a printing plate on a plate cylinder in correspondence with a layout sheet, comprising:

a layout cylinder for accepting mounting of said layout sheet thereto;

a frame rotatably supporting said layout cylinder;

said frame including plate cylinder support means for rotatably supporting said plate cylinder with an axis thereof parallel to an axis of said layout cylinder;

a drive mechanism for synchronously rotating said plate and layout cylinders in opposite directions at equal circumferential displacement rates;

first and second video cameras having first and second video displays respectively;

at least one partial mirror supported on said frame at a position proximate and parallel to said plate and layout cylinders to combine light traveling along first and second optical paths from corresponding locations on said plate and layout cylinders to form superimposed images of said plate and layout cylinders viewable along common optical paths defined by focal points of said first and second video cameras respectively;

said frame having a horizontal rail member parallel to and extending a length of said axis of said layout cylinder for supporting said first and second video cameras at positions disposed along said common optical paths to image said superimposed image;

first and second slidable assemblies associated with said first and second video cameras, each mounted on said horizontal rail member and including means for permitting travel along said horizontal rail member;

first and second camera support arms respectively connecting said first and second video cameras to said first and second slidable assemblies;

said first and second camera support arms including means for adjustably positioning said first and second video cameras to set points of focus defining said common optical path for each of said first and second video cameras thereby effecting substantial alignment of virtual extensions of said first and second optical paths with axes of said plate and layout cylinders; and positioning means for disposing said plate and layout cylinders relative to said partial mirror to effect substantially equal object distances from said plate and layout cylinders and substantially perpendicular alignment of virtual extensions of said first and second optical paths with axes of said plate and layout cylinders respectively.

9. The apparatus according to claim 8 wherein said horizontal rail member includes:

a support member mounted in said frame;

at least one rail member determining positions of said first and second video cameras relative said layout and plate cylinders; and support means for variably supporting and positioning said at least one rail member relative to said support member.

10. The apparatus according to claim 9 wherein said support means includes:

a first set of screws disposed over a length of said at least one rail member threaded to said support bar for drawing said at least one rail member towards said support bar; and a second set of screws, individually interposed amongst said first set of screw, said second set of screws being threaded into said at least one rail member and having ends abutting said support member to position said at least one rail member away from said support bar.

* * * * *